US011915267B2

(12) United States Patent
Mongeau

(10) Patent No.: US 11,915,267 B2
(45) Date of Patent: *Feb. 27, 2024

(54) METHOD AND DIGITAL SIGNAGE SERVER FOR MANAGING PLACEMENT OF A DIGITAL SIGNAGE CONTENT BASED ON METRIC THRESHOLDS

(71) Applicant: BROADSIGN SERV INC., St. Louis, MO (US)

(72) Inventor: Bryan Mongeau, Beaconsfield (CA)

(73) Assignee: BROADSIGN SERV INC., St Louis, MO (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/580,767

(22) Filed: Jan. 21, 2022

(65) Prior Publication Data
US 2022/0148036 A1 May 12, 2022

Related U.S. Application Data

(63) Continuation of application No. 16/720,948, filed on Dec. 19, 2019, now Pat. No. 11,263,665.

(51) Int. Cl.
*G06Q 30/02* (2023.01)
*G06Q 30/0251* (2023.01)
(Continued)

(52) U.S. Cl.
CPC ..... *G06Q 30/0261* (2013.01); *G06Q 30/0249* (2013.01); *G06Q 30/0272* (2013.01)

(58) Field of Classification Search
CPC ............... G06Q 30/02; G06Q 30/0261; G06Q 30/0249; G06Q 30/0272; G06Q 30/0251;
(Continued)

(56) References Cited

U.S. PATENT DOCUMENTS 9,911,136 B2 * 3/2018 Want ................. G09F 27/00
11,074,614 B2 * 7/2021 Hannant ............ G06Q 30/0256
(Continued)

FOREIGN PATENT DOCUMENTS

WO   WO 2005/015362 A2 * 2/2005 ............ G06Q 30/00
WO   2007120686 A2   10/2007
(Continued)

OTHER PUBLICATIONS

Lien-Wu Chen; Yu-Fan Ho; Ming-Fong Tsai; Hsi-Min Chen; Chi-Fu Huang, Cyber-Physical Signage Interacting With Gesture-Based Human-Machine Interfaces Through Mobile Cloud Computing (English), IEEE Access (vol. 4 pp. 3951-3960), Sep. 9, 2016 (Year: 2016).*

(Continued)

Primary Examiner — Marilyn G Macasiano

(57) ABSTRACT

Method and server for managing placement of a digital signage content based on metric thresholds. The server stores parameters associated to a plurality of locations. The parameters for each location comprise at least one metric and a corresponding threshold for each metric. The server determines a plurality of candidate locations among the plurality of locations for displaying the content. For each candidate location, the server processes the at least one metric and corresponding threshold of the candidate location to determine if each metric among the at least one metric is within the corresponding threshold. The server identifies one or more target location among the plurality of candidate locations for displaying the content. Each metric among the at least one metric of the one or more target location is within the corresponding threshold. The locations may include digital signage players, geographical areas, displays controlled by a player.

23 Claims, 9 Drawing Sheets

(51) Int. Cl.
*G06Q 30/0241* (2023.01)
*G06Q 30/0272* (2023.01)

(58) Field of Classification Search
CPC ........... G06Q 30/0259; G06Q 30/0264; G06Q 30/0241; G06Q 30/0254; G06Q 10/067; G06Q 30/0246; G06Q 30/0207
See application file for complete search history.

(56) References Cited

U.S. PATENT DOCUMENTS

| | | | |
|---|---|---|---|
| 11,102,257 B2* | 8/2021 | Edgington, Jr. | H04N 21/26241 |
| 2005/0039206 A1* | 2/2005 | Opdycke | G06Q 30/0277 725/23 |
| 2007/0011050 A1 | 1/2007 | Klopf et al. | |
| 2010/0118200 A1* | 5/2010 | Gelman | H04N 21/4131 348/739 |
| 2011/0016002 A1 | 1/2011 | Opdycke | |
| 2011/0106618 A1 | 5/2011 | Ben-Mosh | |
| 2014/0358685 A1* | 12/2014 | Want | G06Q 30/02 705/14.58 |
| 2017/0208370 A1 | 7/2017 | Ray et al. | |
| 2018/0084290 A1* | 3/2018 | Katz | G06V 20/46 |
| 2018/0101872 A1 | 4/2018 | Mongeau | |
| 2021/0241135 A1* | 8/2021 | Branchaud-Charron | G06N 3/082 |
| 2021/0241165 A1* | 8/2021 | Branchaud-Charron | G06N 20/00 |

FOREIGN PATENT DOCUMENTS

| | | | | |
|---|---|---|---|---|
| WO | WO 2012/075167 A2 * | 6/2012 | ............. | H04N 21/25 |
| WO | 2014180987 A1 | 11/2014 | | |
| WO | WO 2017/184177 A1 * | 10/2017 | ............... | G06F 9/48 |
| WO | 2018097845 A1 | 5/2018 | | |

OTHER PUBLICATIONS

Inoue, H.; Suzuki, K.; Sakat, K.; Maeda, K., Deve of a Dig Signage Sys for Automatic Collection and Dist of its Content from the Existing Dig Contents and its field Trials (English), 2011 IEEE/IPSJ International Symposium on Apps and the Internet (pp. 463-468), Jul. 1, 2011 (Year: 2011).*
Moustafa Elhamshary; Anas Basalamah; Moustafa Youssef, A Fine-Grained Indoor Location-Based Social Network (English), IEEE Transactions on Mobile Computing (vol. 16, Issue: 5, pp. 1203-1217, May 4, 2017 (Year: 2017).*
Wook Hyun; MiYoung Huh; Sunghei Kim; ShinGak Kang, Study on Design and implementation of web-based audience measurement platform for digital signage service (English), 2015 17th International Conference on Advanced Communication Technology (ICACT) (pp. 505-510), Jul. 1, 2015 (Year: 2015).*
Ayyasamy, S.; Sivanandam, S. N., A Cluster Based Replication Architecture for Load Blanacing in Peer-to-Peer content Distribution (English), International Journal of Computer Networks & Communications (IJCNC) vol. 2, No. 5, Sep. 2010, Sep. 23, 2010 (Year: 2010).

* cited by examiner

METHOD AND DIGITAL SIGNAGE SERVER FOR MANAGING PLACEMENT OF A DIGITAL SIGNAGE CONTENT BASED ON METRIC THRESHOLDS

TECHNICAL FIELD

The present disclosure relates to the field of digital signage. More specifically, the present disclosure presents a method and a digital signage server for managing placement of a digital signage content based on metric thresholds.

BACKGROUND

Signage refers to graphic designs, such as symbols, emblems, words, etc. In advertising, signage refers to the design or use of signs and symbols to communicate a message to a specific group, usually for the purpose of marketing. Digital signage is a sub segment of signage and comprises the use of digital signage display units also referred to as digital signage players. Digital signage players include liquid-crystal displays (LCDs), light-emitting diode (LED) displays, projector screens, etc. A digital signage player displays a succession of digital signage contents, such as still images, videos, etc. Digital signage is a field in great expansion especially for advertising in a public venue (e.g. an airport, a shopping mall, etc.), because of the potential to advertise dynamically, such as is done with an advertising video.

A plurality of digital signage players is generally placed under the control of a digital signage server. One functionality of the digital signage server is to determine which digital signage content shall be displayed at which digital signage player. Various algorithms may be used for determining a good match between a given digital signage content and one or more digital signage player under the control of the digital signage server.

For example, each digital signage content has a set of characteristics (e.g. demographics of a target audience). The digital signage server processes characteristics associated to the digital signage player under its control to identify one or more digital signage player providing the best possible match with the characteristics of the digital signage content.

However, even if a given digital signage player is identified as being a good match based on the characteristics of the digital signage content, additional considerations may need to be taken into consideration to evaluate if this given digital signage player is really a good match. For example, the digital signage content is an automotive advertising campaign. However, if the given digital signage player is already displaying a high ratio of automotive advertisements, it may be considered boring by potential viewers, it may be considered to be an environment excessively competitive for an advertiser of a competing brand of cars, etc. In this case, a limit on the number of automotive advertisements displayed by the given digital signage player shall be set in place. If the limit is reached, the given digital signage player shall not be selected for displaying an additional automotive advertising campaign, even if the given digital signage player is a perfect match for the characteristics of the additional automotive advertising campaign.

Therefore, there is a need for a new method and digital signage server for managing placement of a digital signage content based on metric thresholds.

SUMMARY

According to a first aspect, the present disclosure provides a method for managing placement of a digital content based on metric thresholds. The method comprises storing in a memory of a server parameters associated to a plurality of locations. The parameters for each location comprise at least one metric and a corresponding threshold for each metric. The method comprises determining, by a processing unit of the server, a plurality of candidate locations among the plurality of locations for displaying the digital content. The method comprises, for each candidate location, processing by the processing unit of the server the at least one metric and the at least one corresponding threshold of the candidate location to determine if each metric among the at least one metric is within the corresponding threshold. The method comprises identifying, by the processing unit of the server, one or more target location among the plurality of candidate locations for displaying the digital content. Each metric among the at least one metric of the one or more target location is within the corresponding threshold.

According to a second aspect, the present disclosure provides a non-transitory computer program product storing instructions. The instruction, when executed by a processing unit of a server, provide for managing placement of a digital content based on metric thresholds according to the aforementioned method.

According to a third aspect, the present disclosure provides a server. The server comprises memory for storing parameters associated to a plurality of locations. The parameters for each location comprise at least one metric and a corresponding threshold for each metric. The server also comprises a processing unit comprising one or more processor. The processing unit determines a plurality of candidate locations among the plurality of locations for displaying the digital content. For each candidate location, the processing unit processes the at least one metric and the at least one corresponding threshold of the candidate location to determine if each metric among the at least one metric is within the corresponding threshold. The processing unit identifies one or more target location among the plurality of candidate locations for displaying the digital content. Each metric among the at least one metric of the one or more target location is within the corresponding threshold.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to the selection of one or more digital signage player for displaying a digital signage content. A pre-selection of candidate players is made, for example based on characteristics of the digital signage content. Target players are then selected among the candidate players, taking into account one or more metric having respectively a threshold.

Figure 1:
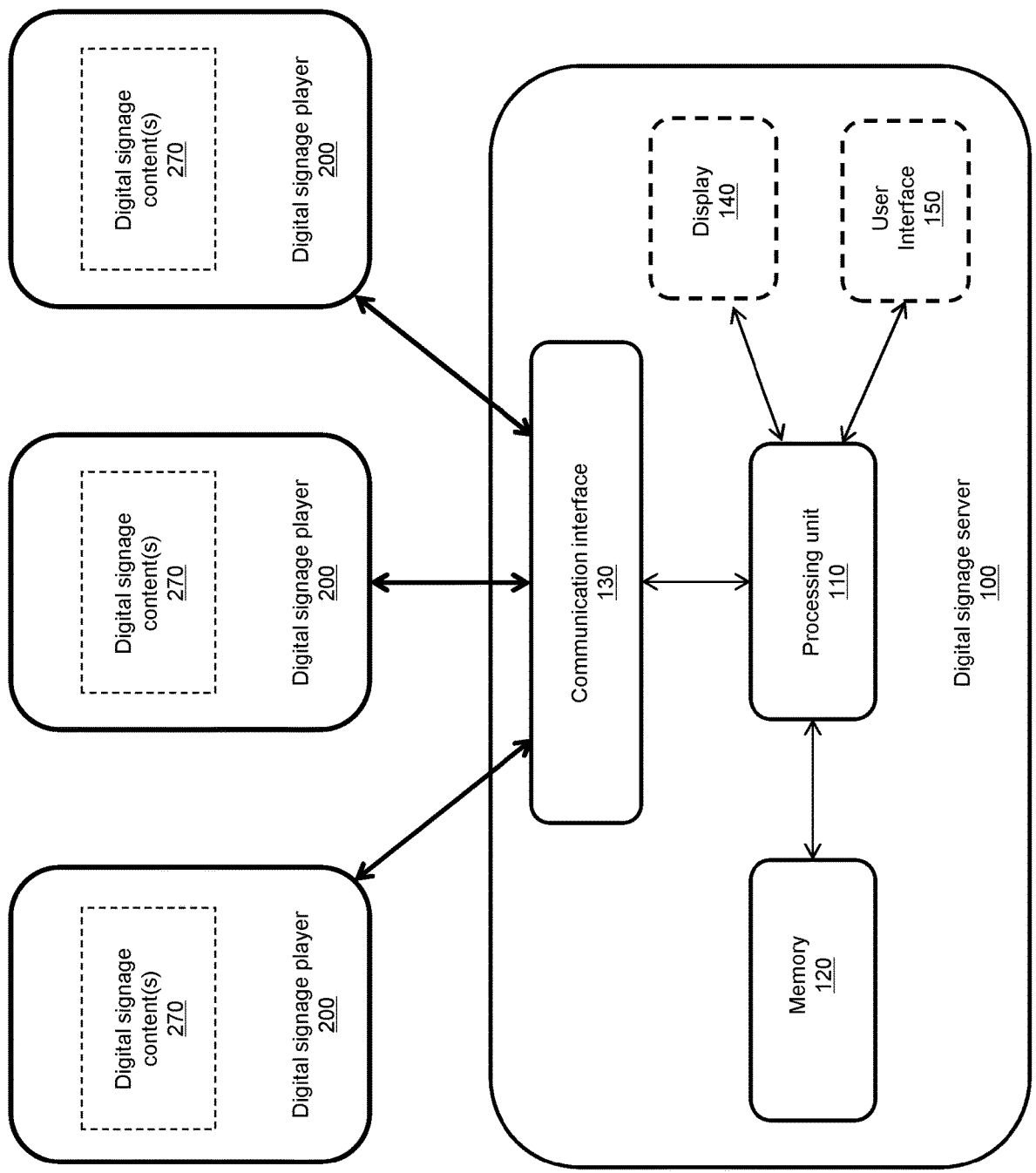
FIG. 1 represents a digital signage server interacting with a plurality of digital signage players.
Figure 2:
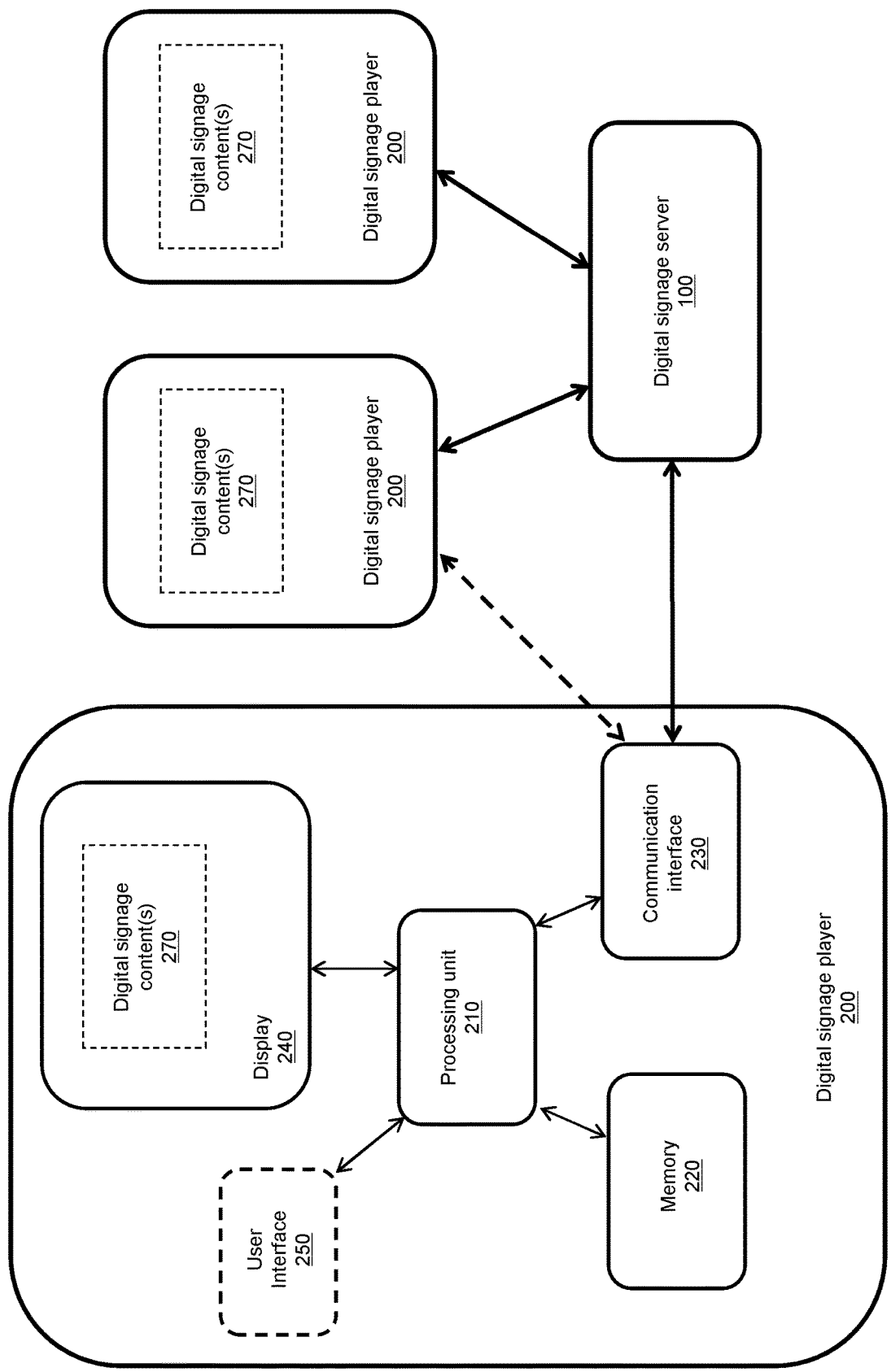
FIG. 2 represents details of one of the digital signage players of FIG. 1.

Referring now concurrently to FIGS. 1 and 2, a digital signage server 100 and a plurality of digital signage players 200 are represented.

Referring more particularly to FIG. 1, details of the digital signage server 100 are illustrated.

For the purpose of clarity, only a single digital signage server 100 is represented in FIG. 1, but the digital signage server 100 may consist of a cluster of generic purpose computers or a cluster of high performance specialized computers.

The digital signage server 100 comprises a processing unit 110. The processing unit 110 comprises one or more processor (not represented in FIG. 1 for simplification purposes) capable of executing instructions of computer program(s) for implementing functionalities of the digital signage server 100 (e.g. receiving data, processing the received data, generating data, transmitting the generated data, etc.). Each processor may further have one or more core.

The digital signage server 100 comprises memory 120. The memory 120 stores instructions of the computer program(s) executed by the processing unit 110, data generated by the execution of the computer program(s), data received via a communication interface 130, etc. The digital signage server 100 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The digital signage server 100 comprises the communication interface 130. The communication interface 130 allows the digital signage server 100 to exchange data with the digital signage players 200, and with other computing devices if needed. The communication interface 130 supports one of the following communication technologies: fixed broadband, Ethernet, cellular (e.g. a 4G or 5G cellular network), Wi-Fi, wireless mesh, Bluetooth®, Bluetooth® Low Energy (BLE), etc. For example, the digital signage server 100 communicates with the digital signage players 200 via a cellular network or a fixed broadband network. Although a single communication interface 130 is represented in FIG. 1, the digital signage server 100 may include several communication interfaces 130, each communication interface 130 supporting a given communication technology for exchanging data with computing devices also supporting the given communication technology.

Optionally, the digital signage server 100 also comprises a display 140 (e.g. a standard screen, a touchscreen, etc.) and/or a user interface 150 (e.g. a keyboard, a mouse, a touchscreen, etc.).

Referring more particularly to FIG. 2, details of one of the digital signage players 200 are illustrated.

The digital signage player 200 comprises a processing unit 210. The processing unit 210 comprises one or more processor (not represented in FIG. 2 for simplification purposes) capable of executing instructions of computer program(s) for implementing functionalities of the digital signage player 200 (e.g. receiving data, processing the received data, generating data, transmitting the generated data, etc.). Each processor may further have one or more core.

The digital signage player 200 comprises memory 220. The memory 220 stores instructions of the computer program(s) executed by the processing unit 210, data generated by the execution of the computer program(s), data received via a communication interface 230, etc. The digital signage player 200 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The digital signage player 200 comprises the communication interface 230. The communication interface 230 allows the digital signage player 200 to exchange data with the digital signage server 100, and with other computing devices if needed (e.g. with other digital signage players 200). The communication interface 230 supports one of the following communication technologies: fixed broadband, Ethernet, cellular (e.g. a 4G or 5G cellular network), Wi-Fi, wireless mesh, Bluetooth®, Bluetooth® Low Energy (BLE), etc. Although a single communication interface 230 is represented in FIG. 2, the digital signage player 200 may include several communication interfaces 230, each communication interface 230 supporting a given communication technology for exchanging data with computing devices also supporting the given communication technology.

The digital signage player 200 comprises a display 240. A single display 240 is represented in FIG. 2. However, the digital signage player 200 may comprise several displays 240. The one or more display 240 consists of, without limitations, a liquid-crystal display (LCD), a light-emitting diode (LED) display, an organic light-emitting diode (OLED) display, a projector screen, a combination thereof, etc. The one or more display 240 may have a large screen, to be visible by a large crowd. The digital signage player 200 is usually located in a public venue (e.g. an airport, a shopping mall, a street, etc.), so that a large number of persons located close to the digital signage player 200 can see a content displayed on its display 240. The display 240 displays one or more digital signage content 270. If the digital signage player 200 controls several displays 240, each controlled display 240 displays the same digital signage content(s) 270, or at least partially different digital signage content(s) 270.

Optionally, the digital signage player 200 also comprises a user interface 250 (e.g. a keyboard, a mouse, a touchscreen, etc.).

Figure 3:
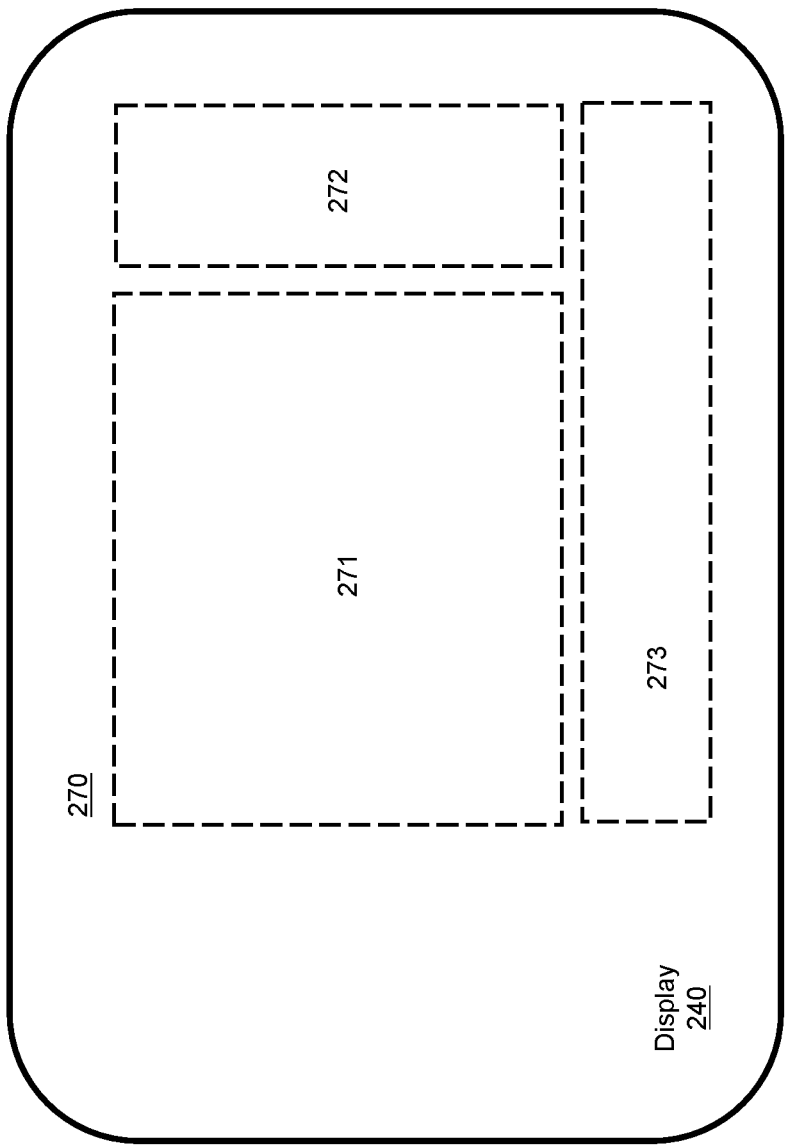
FIG. 3 represents exemplary digital signage contents displayed by one of the digital signage players of FIG. 2.

FIG. 3 illustrates a display 240 of one of the digital signage players 200 of FIG. 2 displaying a plurality of digital signage contents 270. For example, a first digital signage content 271 comprises a larger video image, a second digital signage content 272 comprises a series of static images (such as a local weather report or a Quick Response (QR) code), and a third digital signage content 273 comprises a banner of different series of static images. For any digital signage player 200, at any point in time, the plurality of digital signage contents 270 displayed by its display 240 may include advertising in the form of still or video images, or other contents of interest. The arrangement of the plurality of digital signage contents 270 represented in FIG. 3 may vary. For instance, different numbers of digital signage contents 270 are displayed in different orientations.

Moreover, the number of digital signage contents 270 and their respective orientations varies temporally.

Figure 4:
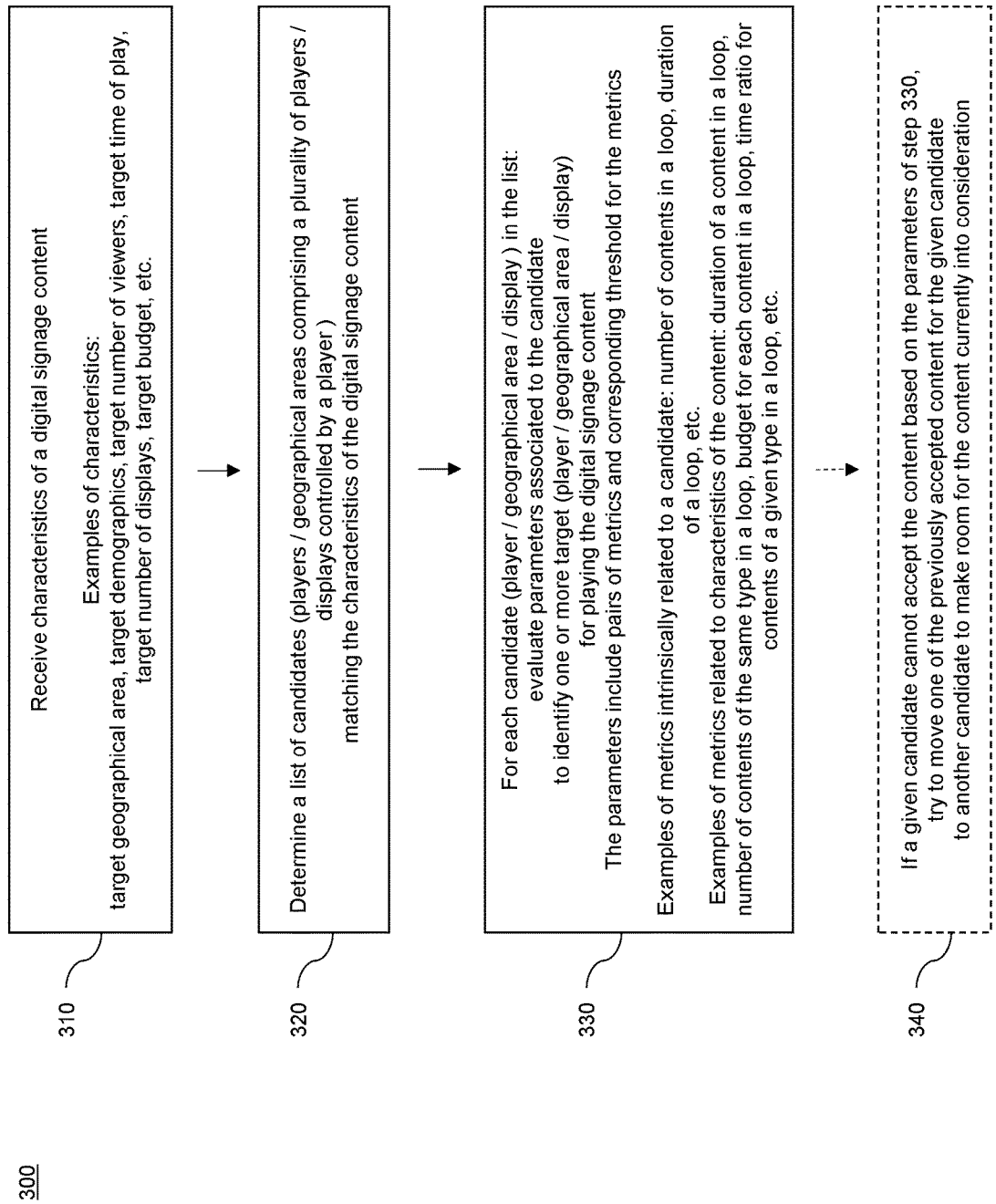
FIG. 4 represents a process for managing the placement of a digital signage content.

Referring now concurrently to FIGS. 1 and 4, a process 300 for managing the placement of a digital signage content is illustrated in FIG. 4. The process 300 is implemented by the digital signage server 100 and aims at identifying digital signage players 200 for displaying the digital signage content. The placement is a two steps process, including a first step 320 focusing on characteristics of the digital signage content, and a second step 330 focusing on parameters associated to the digital signage players 200.

The process 300 includes the step 310 of receiving characteristics of the digital signage content. Examples of characteristics include a target geographical area, a target number of viewers, a target time of play, a target number of displays, a target budget, etc. A given digital signage content has one or more characteristics, which is taken into consideration at step 320, and optionally at step 330.

Exemplary target geographical areas include a region, a city, a district of a city, a building (e.g. an airport, a store), an area in a building (e.g. an airport departure lounge), etc.

Exemplary target demographics include gender, age range, profession, domain of interest, etc.

Exemplary target numbers of viewers include a number of viewers per minute, per hour, per day, during a given interval of time, etc.

Exemplary target times of play include one or more time for playing (e.g. at 7 am, 12 pm and 18 hpm), one or more interval of time for playing (e.g. from 6 am to 8 am and from 11 am to 2 pm), one or more day for playing (e.g. every day, only Monday to Friday, only the week-end), etc.

Exemplary target numbers of displays include a number of displays per hour, a number of displays per day, a number of displays per week, etc.

The process 300 includes the step 320 of determining a list of candidate digital signage players 200 and/or a list of candidate geographical areas comprising a plurality of digital signage players 200 and/or a list of candidate displays 240 under the control of a given digital signage player 200, matching the characteristics of the digital signage content received at step 310.

Implementations of step 320 are already known in the art. For example, U.S. patent application Ser. No. 15/290,337 discloses an implementation where audience segments are allocated to a plurality of digital signage players 200. An algorithm determines the audience segments matching the characteristics of the digital signage content. The list of candidate digital signage players 200 at step 320 consists of the digital signage players 200 having audience segments matching the characteristics of the digital signage content. For example, the audience segments include at least one of the following: data related to a gender of the audience, data related to an age range of the audience, data related to a salary range of the audience, data related to a profession of the audience, data related to a domain of interest of the audience, and data related to a geographical area where the corresponding digital signage player 200 is located.

Alternatively, the audience segments are allocated to a plurality of geographical areas. Each geographical area comprises a plurality of digital signage players 200. The aforementioned algorithm is used for determining the list of candidate geographical areas at step 320. The list of candidate geographical areas consists of the geographical areas having audience segments matching the characteristics of the digital signage content.

The process 300 includes the step 330 of identifying one or more target (digital signage player 200 and/or geographical area and/or display 240) for playing the digital signage content among the list of candidates determined at step 320. The identification is performed by an algorithm evaluating parameters associated to each candidate.

One of the objects of the present disclosure is to provide an implementation of step 330, and more specifically to describe how the parameters are taken into consideration for selecting the targets among the candidates. As will be detailed later in the description, the parameters include one or more of the following pairs: a metric and a corresponding threshold for the metric.

Some of the metrics are intrinsic to the target (digital signage player 200 or geographical area or display 240). Examples of intrinsic metrics include a number of contents in a loop, a duration of a loop, etc. A given candidate (player or geographical area or display) has zero, one or more metric, which is taken into consideration at step 330. An exemplary pair of parameters (metric and associated threshold) consists of a current duration of a loop and a maximum duration for the loop.

A loop is a collection of digital signage contents which are displayed consecutively by a digital signage player 200. The loop is repeated several times over a given period of time. For example, a loop has a duration of 5 minutes, includes 10 different digital signage contents, and is repeated four times within an hour (e.g. every 15 minutes). The notion of loop can be extended beyond the context of digital signage, to define a duration over which one or more content is displayed one or more time respectively.

Some of the metrics are related to the characteristics of the digital signage content (received at step 310). Examples of metrics related to the characteristics of the digital signage content include a duration of a content in a loop, a number of contents of a given type in a loop, a budget for each content in a loop, a time ratio for contents of a given type in a loop, a time ratio per targeted demographics in a loop, etc. An exemplary pair of parameters (metric and associated threshold) consists of a duration of the candidate content and a maximum duration of a content in the loop.

A type of content identifies a specific category of products/services (e.g. automotive, travel, food, etc.). It is also referred to as a vertical in the advertising industry.

In a first implementation of the process 300, the characteristics of the digital signage content (received at step 310) are taken into consideration for step 320, but not for step 330. In a second implementation of the process 300, the same characteristics of the digital signage content (received at step 310) are taken into consideration for steps 320 and 330. In a third implementation of the process 300, the characteristics of the digital signage content (received at step 310) are taken into consideration for steps 320 and 330, but some of the characteristics are taken into consideration only for step 320 or 330.

The process 300 includes the optional step 340 of attempting to make room for the digital signage content at a candidate where it was rejected for failing to comply with the parameters of the candidate at step 330. Step 340 is performed if, after performing step 330, the identified target(s) do no allow to reach the placement target(s) of the digital signage content. For example, one of the placement targets is to display the digital signage content at a specific location (e.g. at Montreal airport). However, none of the candidates located at the specific location were identified at step 330, because the evaluation of their respective parameters (metrics and corresponding thresholds) failed. For example, for each candidate located at the specific location, the number of contents in their respective loops has already reached their respective threshold (maximum number of contents per loop).

In this case, an attempt is made to move a digital signage content previously accepted at one of the candidates to another candidate. For example, the current digital signage content is not accepted at candidate n after performing steps 310, 320 and 330. Another digital signage content was previously accepted at candidate n after performing steps 310, 320 and 330. Steps 310, 320 and 330 are performed again for the other digital signage content. If a candidate m is identified at step 330, then the other digital signage content is moved from candidate n to candidate m, and the current digital signage content is accepted at candidate n.

Reference is now made concurrently to FIGS. 1, 4, 5A, 5B, 5C and 5D; where FIGS. 5A-D illustrate various configurations for implementating step 330 of the process 300.

Figure 5A:
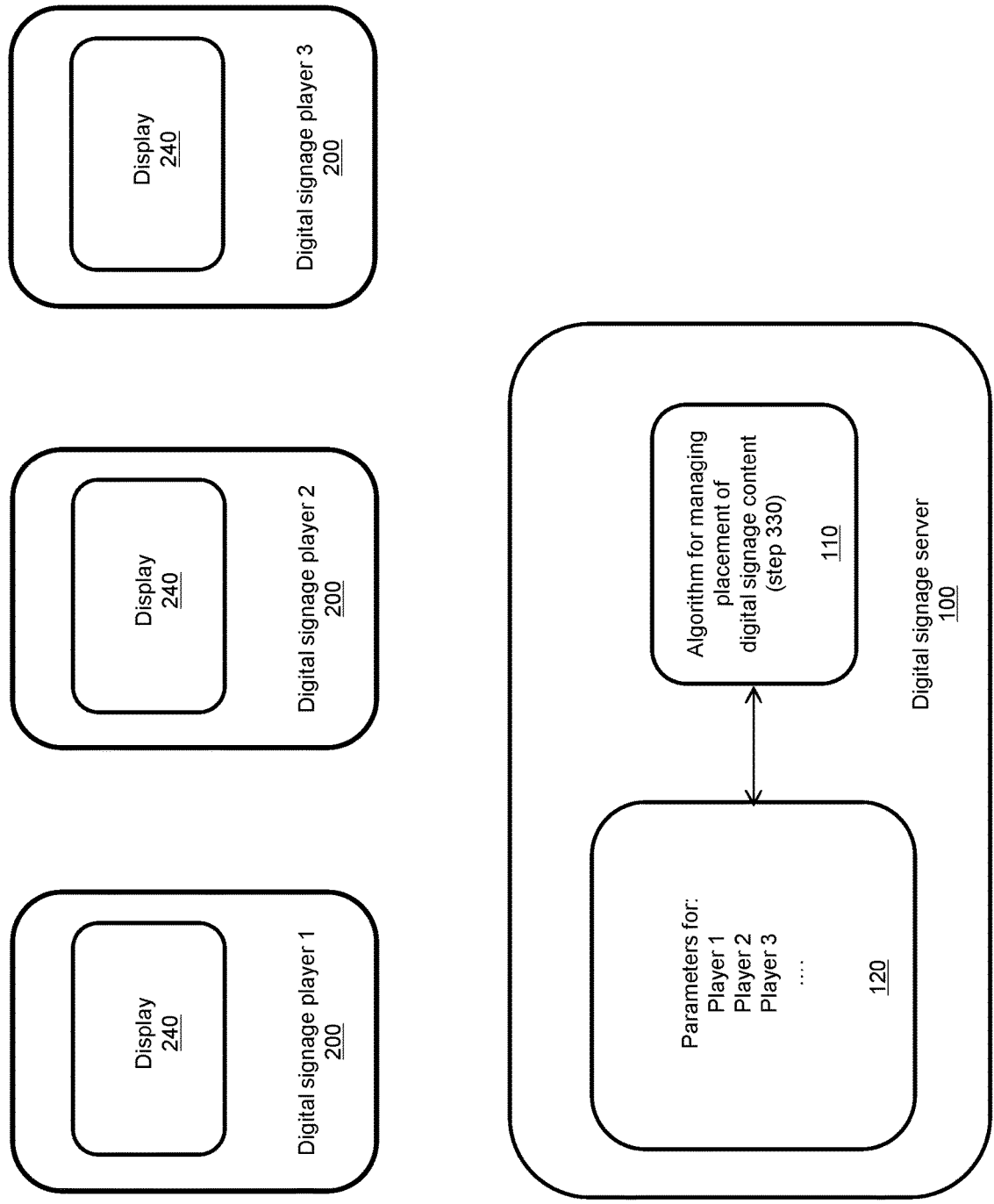
FIGS. 5A, 5B, 5C and 5D illustrate different levels of location granularity for implementing the process of FIG. 4.

FIG. 5A illustrates a configuration where each digital signage player 200 is taken into consideration individually when performing step 330 of the process 300. Each digital signage player 200 has its own set of parameters, which may differ from one player to another. If a digital signage player 200 controls more than one display 240, it is not taken into consideration at step 330. The granularity of the algorithm implementing step 330 is at the digital signage player level.

Figure 5B:
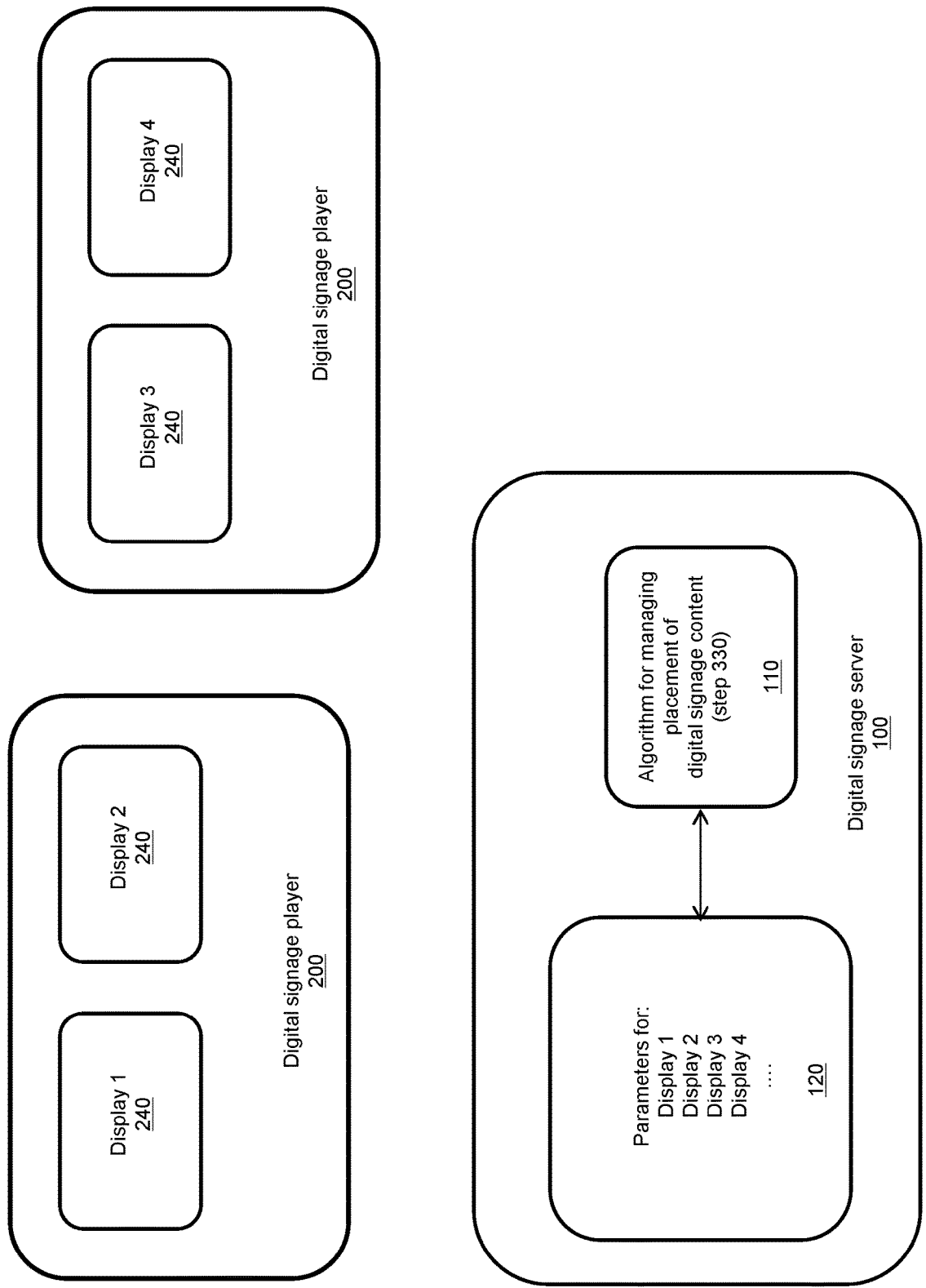

FIG. 5B illustrates a configuration where at least some of the digital signage players 200 control more than one display 240. Each display 240 of a digital signage player 200 is taken into consideration individually when performing step 330 of the process 300. Each display 240 of a digital signage player 200 has its own set of parameters, which may differ from one display to another. The granularity of the algorithm implementing step 330 is at the display level.

Figure 5C:
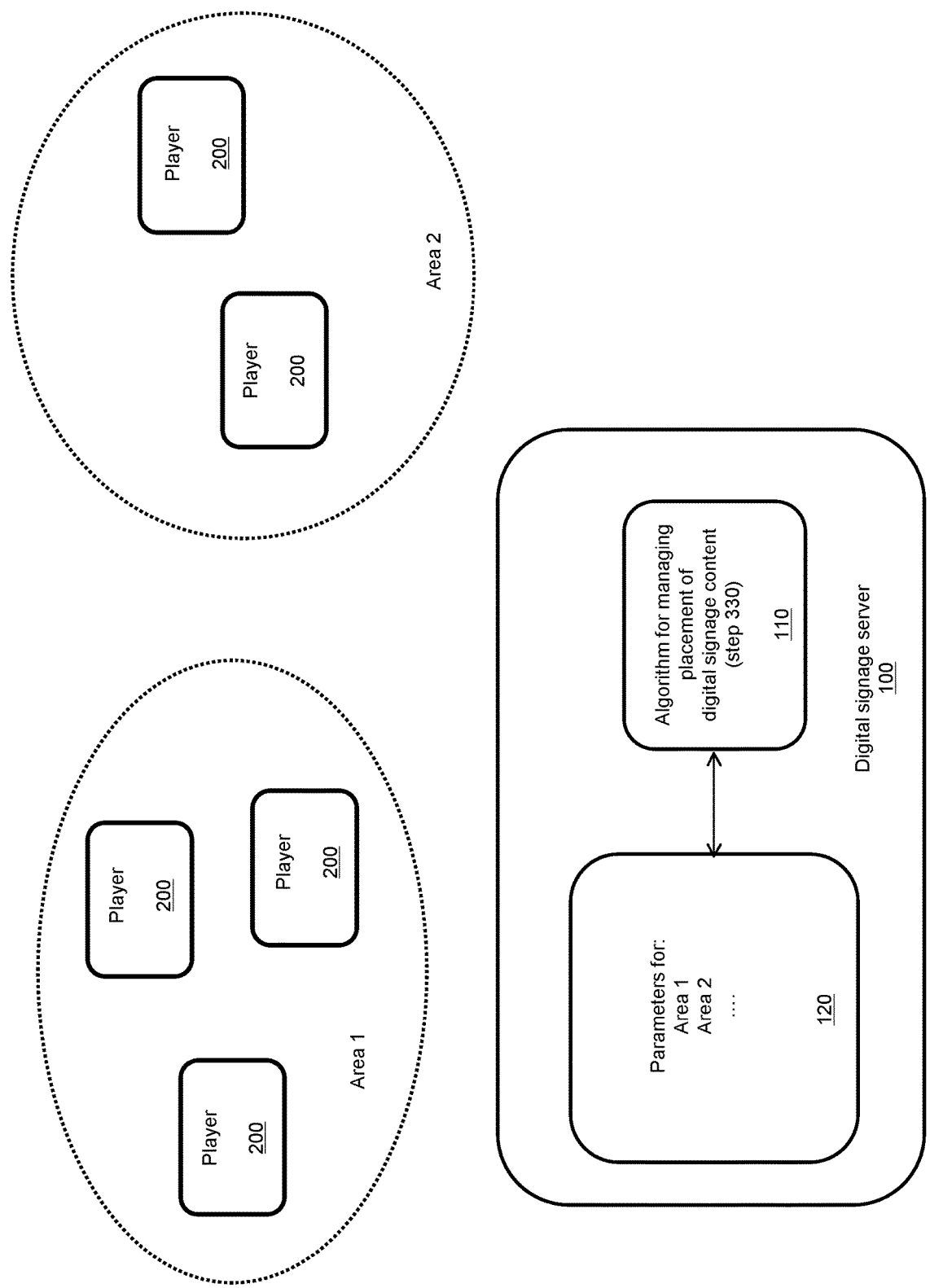

FIG. 5C illustrates a configuration where several digital signage players 200 are grouped into a geographical area. Each geographical area is taken into consideration individually when performing step 330 of the process 300. Each geographical area has its own set of parameters, which may differ from one geographical area to another. The granularity of the algorithm implementing step 330 is at the geographical area level.

Figure 5D:
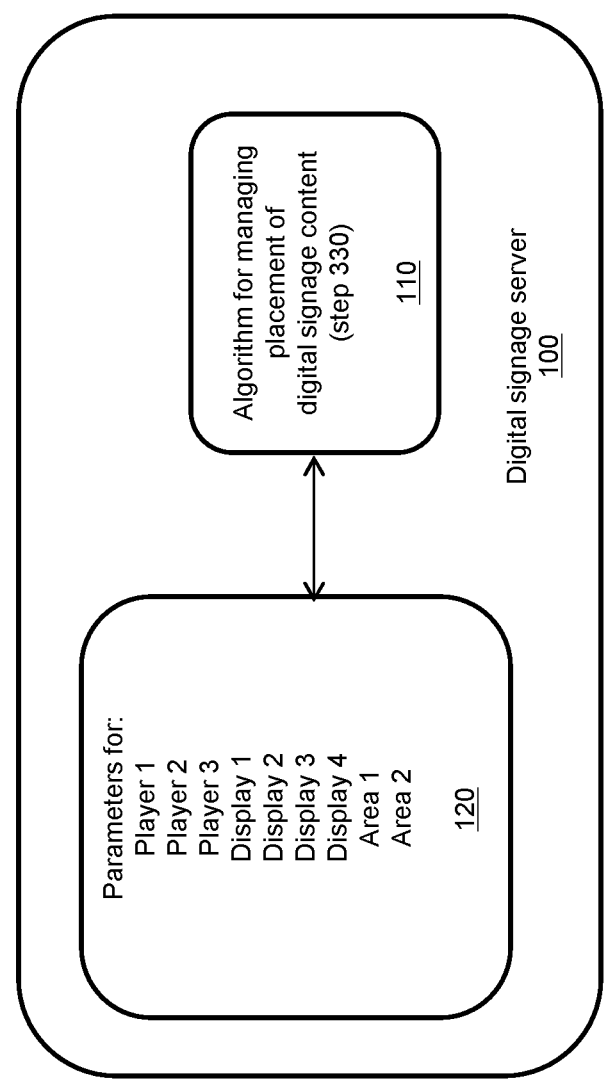

FIG. 5D illustrates a configuration where several levels of granularity are taken into consideration simultaneously when performing step 330 of the process 300. More specifically, the players (1, 2 and 3) represented into FIG. 5A, the displays (1, 2, 3 and 4) represented in FIG. 5B and the geographical areas (1 and 2) represented in FIG. 5C, have their respective set of parameters used at step 330 of the process 300.

A person skilled in the art would readily understand that any other combination of granularity levels may be taken into consideration (e.g. players and displays, players and geographical areas, etc.) when performing step 330 of the process 300. Furthermore, additional levels of granularity may be introduced for performing step 330 of the process 300.

In the rest of the description, the terminology location will be used for generally addressing the different possible levels of granularity. Thus, a location may refer to a given digital signage player 200, a given display 240 controlled by a given digital signage player 200, a given geographical location (comprising one or more digital signage player 200), etc.

The implementation of step 320 of the process 300 also takes into consideration locations corresponding to one or more of the previously defined levels of granularity. In this case, locations matching the characteristics of the digital signage content are identified at step 320.

Figure 6:
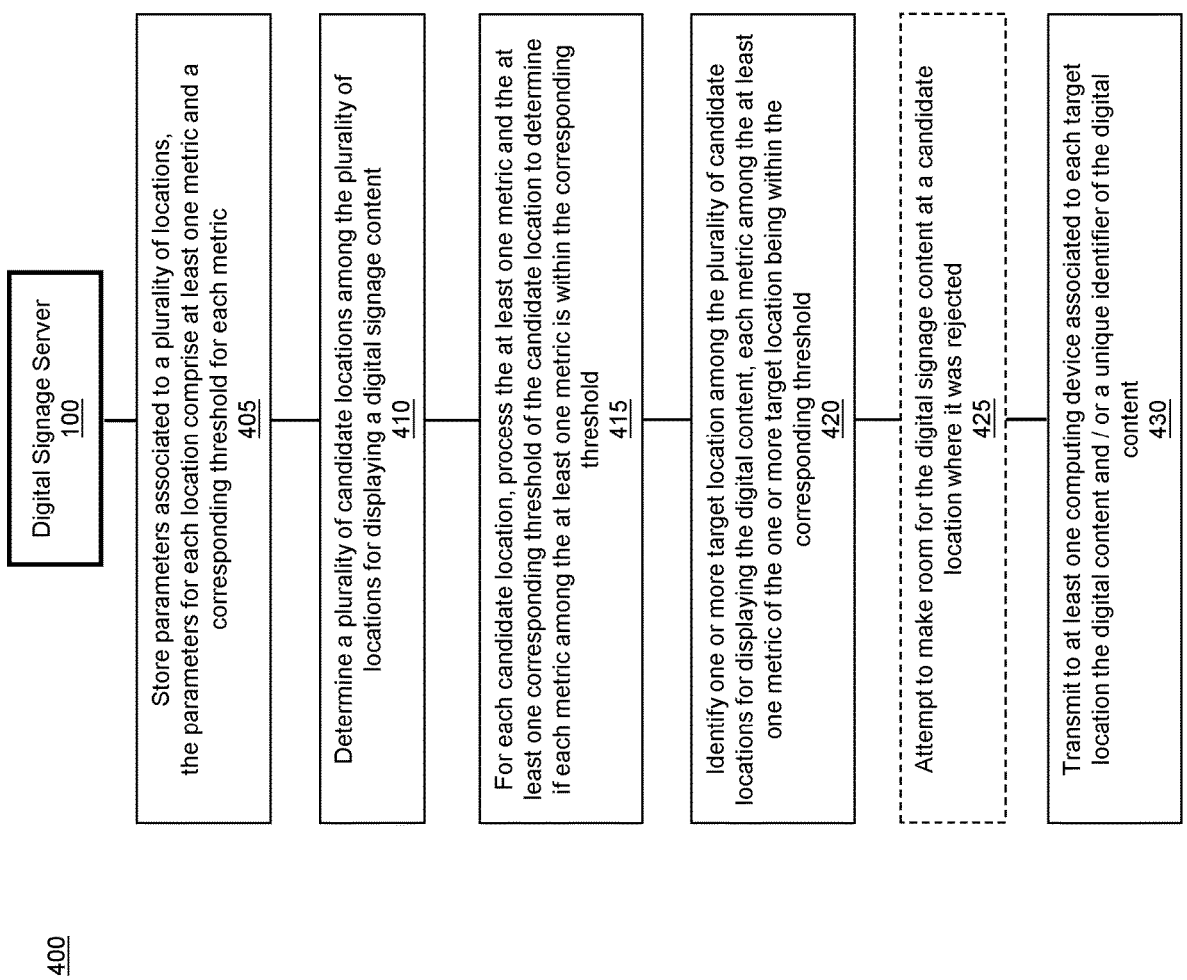
FIG. 6 represents a method implemented by the digital signage server of FIG. 1 for managing placement of a digital signage content based on metric thresholds.

Referring now concurrently to FIGS. 1, 4 and 6, a method 400 for managing placement of a digital signage content based on metric thresholds is represented in FIG. 6. The method 600 is an implementation of the process 300 represented in FIG. 4. The method 600 is performed by the digital signage server 100.

A dedicated computer program has instructions for implementing the steps of the method 400. The instructions are stored in a non-transitory computer program product (e.g. the memory 120). The instructions provide for managing placement of a digital signage content based on metric thresholds, when executed by the processing unit 110 of the digital signage server 100. The instructions are deliverable via an electronically-readable media, such as a storage media (e.g. a USB key), or via communication links (e.g. a Wi-Fi or cellular network) through the communication interface 130 of the digital signage server 100.

The method 400 comprises the step 405 of storing in the memory 120 parameters associated to a plurality of locations. Step 405 is executed by the processing unit 110.

The various types of locations have been described previously in relation to FIGS. 5A-D. A location is generally identified by a unique identifier, and a descriptive field is associated to the unique identifier. The descriptive field is an alphanumerical label which can be understood by a human being when displayed on the display 140 (e.g. "Player No 2 in departure hall 24 of Montreal airport"). Thus, a data structure stored in the memory 120 may take the form of a list of records. Each record comprises the unique identifier of a given location, the descriptive field of the given location, and the parameters for the given location.

The locations considered at step 405 may be of the same type (e.g. only players, only geographical areas, only displays, etc.) or a combination of several types of locations (e.g. a combination of players and geographical areas, a combination of players and displays, etc.).

The parameters comprise at least one metric and a corresponding threshold for each metric. Examples of metrics have been described in relation to step 330 of the process 300 represented in FIG. 4. For example, a first location has two associated parameters and two corresponding thresholds, a second location also has two associated parameters and two corresponding thresholds, a third location has three associated parameters and three corresponding thresholds, etc. More details about how the thresholds are applied to the metrics will be provided when describing step 415 of the method 400.

The method 400 comprises the step 410 of determining a plurality of candidate locations among the plurality of locations (referred to at step 405) for displaying a digital signage content. Step 410 is executed by the processing unit 110.

The implementation of step 410 may vary. An exemplary implementation has been provided in relation to steps 310 and 320 of the process 300 represented in FIG. 4.

The exemplary implementation of step 410 comprises receiving by the digital signage server characteristics of the digital signage content. The characteristics are received via the communication interface 130 from a remote computing device (not represented in FIG. 1 for simplification purposes). Alternatively, the characteristics are received via the user interface 150 from a user. Examples of characteristics of the digital signage content have been provided previously in relation to step 310 of the process 300. The characteristics are defined by an owner of the digital signage content, who wants to have the digital signage content displayed at one or more location under the control of the digital signage server 100.

The exemplary implementation of step 410 further comprises determining the (candidate) locations among the plurality of locations matching the characteristics of the digital signage content. The matching of the locations with the characteristics of the digital signage content has been previously described in relation to step 320 of the process 300.

The method 400 comprises the step 415 consisting of: for each candidate location (determined at step 410), processing the at least one metric and the at least one corresponding threshold of the candidate location to determine if each metric among the at least one metric is within the corresponding threshold. Step 415 is executed by the processing unit 110.

For example, a first candidate location $L_1$ has two metrics $M_{11}$ and $M_{12}$, and two corresponding thresholds $T_{11}$ and $T_{12}$. Step 415 comprises determining if $M_{11}$ is within $T_{11}$ and $M_{12}$ is within $T_{12}$. A second candidate location $L_2$ has three metrics $M_{21}$, $M_{22}$ and $M_{23}$, and three corresponding thresholds $T_{21}$, $T_{22}$ and $T_{23}$. Step 415 comprises determining if $M_{21}$ is within $T_{21}$, $M_{22}$ is within $T_{22}$ and $M_{23}$ is within $T_{23}$.

Different types of thresholds may be used, each metric having its own type of threshold. Furthermore, the type of threshold and/or the value of a threshold for a given metric may vary from on candidate location to another.

For example, the threshold for a given metric is a maximum value. A determination is made at step 415 that the value of the metric is lower (alternatively lower or equal) than the maximum value. In another example, the threshold for a given metric is a minimum value. A determination is made at step 415 that the value of the metric is higher (alternatively higher or equal) than the minimum value. In still another example, the threshold for a given metric is an inclusive interval of values. A determination is made at step 415 that the value of the metric is within (strictly or not) the inclusive interval of values. In yet another example, the threshold for a given metric is an exclusive interval of values. A determination is made at step 415 that the value of the metric is outside (strictly or not) the exclusive interval of values. The present disclosure is not limited to the aforementioned types of thresholds, which are for illustration purposes only.

The method 400 comprises the step 420 of identifying (based on the processing performed at step 415) one or more target location among the plurality of candidate locations (determined at step 410) for displaying the digital signage content. A target location has the following property: each metric among the at least one metric of the target location is within the corresponding threshold. Step 420 is executed by the processing unit 110.

Considering the previous example, candidate location $L_1$ has two metrics $M_{11}$ and $M_{12}$, and two corresponding thresholds $T_{11}$ and $T_{12}$. For illustration purposes, we consider that threshold $T_{11}$ is a strict maximum value and that threshold $T_{12}$ is a non strict minimum value. Candidate location L1 is identified as a target location at step 420 if $(M_{11} < T_{11})$ AND $(M_{12} >= T_{12})$. Otherwise, candidate location L1 is not identified as a target location.

All the metrics which have been introduced when describing step 330 of the process 300 of FIG. 4 are applicable to steps 405, 415 and 420 of the method 400. However, the present disclosure is not limited to these metrics. A person skilled in the art would readily understand that additional metrics and their corresponding thresholds may be defined and used for implementing the method 400. Following are examples of metrics and corresponding thresholds. When referring to the candidate digital signage content, it consists of a digital signage content for which the method 400 aims at identifying target location(s).

An exemplary metric is the number of digital signage contents in a loop scheduled at the candidate location. A maximum number of contents is defined at step 405. At steps 415 and 420, the current number of contents in the loop is compared to the maximum number of contents to determine if the candidate location is a target location. If the determination is positive, the candidate digital signage content is added to the loop and the current number of contents in the loop is incremented.

Another exemplary metric is the duration of a loop scheduled at the candidate location. A maximum duration of the loop is defined at step 405. At steps 415 and 420, the current duration of the loop is tentatively incremented by the duration of the candidate digital signage content (to take into consideration the potential addition of the candidate digital signage content) and compared to the maximum duration of the loop to determine if the candidate location is a target location. If the determination is positive, the candidate digital signage content is added to the loop and the current duration of the loop is incremented by the duration of the candidate digital signage content.

Another exemplary metric is the duration of the digital signage contents. A maximum duration of any content (inserted in a loop scheduled at the candidate location) is defined at step 405. At steps 415 and 420, the duration of the candidate digital signage content is compared to the maximum duration of any inserted content to determine if the candidate location is a target location. If the determination is positive, the candidate digital signage content is added to the loop.

Another exemplary metric is the number of digital signage contents of a given type in a loop scheduled at the candidate location. The candidate digital signage content is related to a given type of content (e.g. automotive). A maximum number of contents for the given type (e.g. automotive) is defined at step 405. At steps 415 and 420, the current number of contents of the given type in the loop is tentatively incremented (to take into consideration the potential addition of the candidate digital signage content) and compared to the maximum number of contents of the given type, to determine if the candidate location is a target location. If the determination is positive, the candidate digital signage content is added to the loop and the current number of contents of the given type in the loop is incremented.

A plurality of thresholds can be defined for a plurality of types of content (to be taken into consideration by the method 400). For example, a given candidate location has a limit of 2 automotive related contents, 3 travel related contents, and 3 food related contents in a loop.

Another exemplary metric is the budget for a digital signage content. A minimum budget for a content (inserted in a loop scheduled at the candidate location) is defined at step 405. At steps 415 and 420, the budget for the candidate digital signage content is compared to the minimum budget for a content to determine if the candidate location is a target location. If the determination is positive, the candidate digital signage content is added to the loop.

Another exemplary metric is the time ratio for digital signage contents of a given type in a loop scheduled at the candidate location. The candidate digital signage content is related to a given type of content (e.g. food). A maximum time ratio for contents of the given type (e.g. food) is defined at step 405. At steps 415 and 420, the current time ratio for the given type of content in the loop is tentatively updated (to take into consideration the duration of the candidate digital signage content) and compared to the maximum time ratio for the given type of content, to determine if the candidate location is a target location. If the determination is positive, the candidate digital signage content is added to the loop and the current time ratio for the given type of content in the loop is updated based on the duration of the candidate digital signage content.

For the thresholds defined with respect to different types of contents, several levels of granularity can be used. For example, a first level consists of thresholds defined for large categories of products or services (e.g. automotive, travel, food, etc.). A second level consists of thresholds defined within one of the large categories (e.g. thresholds for various brands or types of cars, thresholds for various types of vacations, thresholds for various types of food, etc.). For instance, a first threshold T1 is defined for the category automotive, a second threshold T2 is defined for the category travel and a third threshold T3 is defined for the category food. No second level thresholds are defined for the categories travel and food. However, for the category automotive, a secondary threshold T1_1 is defined for the category SUV, a secondary threshold T1_2 is defined for the category luxury cars, etc.

Another exemplary metric is the time ratio per targeted demographics in a loop scheduled at the candidate location. The candidate digital signage content targets a given demographic (e.g. young adults from 18 to 30 years old). A maximum time ratio for contents associated to various demographics (e.g. 20% bellow 18 years old, 30% from 18 to 30 years old, 30% from 30 to 55 years old, and 20% above 55 years old) is defined at step 405. At steps 415 and 420, the current time ratio in the loop for the given demographic (e.g. from 18 to 30 years old) associated to the candidate digital signage content is tentatively updated (to take into consideration the duration of the candidate digital signage content) and compared to the maximum time ratio for the given demographic, to determine if the candidate location is a target location. If the determination is positive, the candidate digital signage content is added to the loop and the current time ratio for the given demographic in the loop is updated based on the duration of the candidate digital signage content.

Furthermore, the threshold for a metric may be defined for a given time-slot, and vary from one time-slot to another. For example, considering the metric consisting of the time ratio per targeted demographics. For the demographic defined as persons below 18 years old, the maximum ratio is set to 10% before 6 am and after 6 pm, and 20% between 6 am and 6 pm. For the demographic defined as persons from 18 to 30 years old, the maximum ratio is set to 15% before 8 am, and 25% after 8 am. In this case, a candidate digital signage content targeting a given demographic (e.g. from 18 to 30 years old) may be added to a loop played during a given time-slot (e.g. after 8 am), but may not be added to a loop played during another time-slot (e.g. before 8 am).

Any combination including one or more of the aforementioned exemplary metrics can be taken into consideration for applying the method 400 to a candidate location at steps 415 and 420. Furthermore, some of the metrics may be activated or de-activated based on characteristics of the candidate digital signage content, particular operating conditions at a candidate location, etc. Additionally, the thresholds associated to the metrics are configurable, and may be adapted based on particular operating conditions at a candidate location, etc.

Following is an array illustrating metrics and corresponding thresholds used for two different candidate locations $L_1$ and $L_2$. When a metric is not applicable to one of the two candidate locations, the terminology N.A. is used.

| Metric | Threshold for $L_1$ | Threshold for $L_2$ |
|---|---|---|
| Number of contents in a loop | Maximum of 10 | N.A. |
| Duration of a loop | N.A. | Maximum of 1 minute |
| Duration of a given content in a loop | Maximum of 10 seconds | Minimum of 20 seconds |
| Number of contents of a given type in a loop | Maximum of 2 contents related to automotive AND maximum of 3 contents related to food | Maximum of 3 contents related to automotive AND maximum of 1 automotive content related to SUVs and maximum of 2 automotive contents related to luxury cars |
| Budget for each content in a loop | Minimum of 100$ | N.A. |
| Time ratio for contents of a given type in a loop | Maximum of 50% of the time for contents related to food AND maximum of 10% of the time for food contents related to beverages AND maximum of 25% of the time for food contents related to fast foods | Maximum of 30% of the time for contents related to automotive and maximum of 30% of the time for contents related to food |
| Time ratio per targeted demographics in a loop | N.A. | Maximum of 20% of the time for the demographic bellow 18 years old AND maximum of 25% of the time for the demographic over 60 years old |

Following are use cases for determining if a candidate digital signage content is accepted at $L_1$ and $L_2$, according to steps 415 and 420.

A candidate digital signage content is not accepted at $L_1$ if the current number of contents in a loop is equal to 10; and may be accepted (based on the other metrics) if the current number of contents in the loop is lower than 10.

A candidate digital signage content is not accepted at $L_2$ if the current duration of a loop+the duration of the candidate digital signage content is greater than 1 minute; and may be accepted (based on the other metrics) if the current duration of the loop+the duration of the candidate digital signage content is lower or equal than 1 minute.

A candidate digital signage content is not accepted at $L_1$ if the duration of the candidate digital signage content is greater than 10 seconds; and may be accepted (based on the other metrics) if the duration of the candidate digital signage content is lower or equal than 10 seconds.

A candidate digital signage content is not accepted at $L_2$ if the duration of the candidate digital signage content is lower than 20 seconds; and may be accepted (based on the other metrics) if the duration of the candidate digital signage content is greater or equal than 20 seconds.

A candidate digital signage content of type automotive is not accepted at $L_1$ if the current number of contents of type automotive in a loop is greater than 2; and may be accepted (based on the other metrics) if the current number of contents of type automotive in the loop is lower or equal than 2.

A candidate digital signage content of type food is not accepted at $L_1$ if the current number of contents of type food in a loop is greater than 3; and may be accepted (based on the other metrics) if the current number of contents of type food in the loop is lower or equal than 3.

A candidate digital signage content of type automotive is not accepted at $L_2$ if the current number of contents of type automotive in a loop is greater than 3.

Assuming the current number of contents of type automotive in a loop is lower or equal than 3. A candidate digital signage content of type automotive SUV is not accepted at $L_2$ if the current number of contents of type automotive SUV in the loop is equal to 1; and may be accepted (based on the other metrics) if the current number of contents of type automotive SUV in the loop is equal to 0.

Assuming the current number of contents of type automotive in a loop is lower or equal than 3. A candidate digital signage content of type automotive luxury car is not accepted at $L_2$ if the current number of contents of type automotive luxury car in the loop is greater than 2; and may be accepted (based on the other metrics) if the current number of contents of type automotive luxury car in the loop is lower or equal than 2.

A candidate digital signage content is not accepted at $L_1$ if the budget for the candidate digital signage content is lower than 100 $; and may be accepted (based on the other metrics) if the budget for the candidate digital signage content is greater or equal than 100 $.

Examples for the metric "time ratio for contents of a given type in a loop" are not provided since they would be similar to the examples provided for the metric "number of contents of a given type in a loop", with the exception that the evaluation would be base on the time ratio in place of the number.

Assuming the candidate digital signage content targets the demographic bellow 18 years old. The candidate digital signage content is not accepted at $L_2$ if the current time ratio for the demographic bellow 18 years old adjusted with the duration of the candidate digital signage content is greater than 20%; and may be accepted (based on the other metrics) if the current time ratio for the demographic bellow 18 years old adjusted with the duration of the candidate digital signage content is lower or equal than 20%.

Assuming the candidate digital signage content targets the demographic over 60 years old. The candidate digital signage content is not accepted at $L_2$ if the current time ratio for the demographic over 60 years old adjusted with the duration of the candidate digital signage content is greater than 25%; and may be accepted (based on the other metrics) if the current time ratio for the demographic over 60 years old adjusted with the duration of the candidate digital signage content is lower or equal than 25%.

The method 400 comprises the step 430 of transmitting to at least one computing device associated to each target location (identified at step 420) the digital signage content and/or a unique identifier of the digital signage content. Step 430 is executed by the processing unit 110 and the transmission is made via the communication interface 130.

If the target location is a digital signage player 200 as illustrated in FIG. 5A, the digital signage content and/or unique identifier of the digital signage content is transmitted to the digital signage player 200.

If the target location is a display 240 as illustrated in FIG. 5B, the digital signage content and/or unique identifier of the digital signage content is transmitted to the digital signage player 200 controlling the display 240.

If the target location is a geographical area as illustrated in FIG. 5C, the digital signage content and/or unique identifier of the digital signage content is transmitted to the plurality of digital signage players 200 located in the geographical area.

The method 400 comprises the optional step 425 of attempting to make room for the digital signage content at a candidate location where it was rejected for failing to comply with the parameters of the candidate location. This optional step is performed after step 420, and corresponds to the optional step 340 of the process 300 represented in FIG. 4.

As described previously in relation to FIG. 4, the current digital signage content is rejected at candidate location m. Another digital signage content has been previously accepted at candidate location m. An attempt is made to move the other digital signage content to another location. For example, the method 400 is applied to the other digital signage content and a target location n is identified at step 420. The other digital signage content is moved to location n and the current digital signage content is accepted at location m (if the evaluation of the parameters of location m at step 420 for the current digital signage content is positive following the move of the other content from location m to location n).

It may be necessary to evaluate several other digital signage contents previously accepted at candidate location m, before identifying a movement of one of the other digital signage contents which renders the current digital signage content acceptable at candidate location m. It may be necessary to move more than one other digital signage content previously accepted at candidate location m, to render the current digital signage content acceptable at candidate location m. It may be necessary to loop through several candidate locations were the current digital content was rejected, before identifying a candidate location for which one or more previously accepted other digital signage content can be moved to another location, to make room for the current digital signage content.

The present disclosure is not limited to the field of digital signage content, but can be extended to any type of digital content. In particular, the digital signage server 100 can be extended to any type of server capable of implementing the method 400. Similarly, the digital signage player 200 can be extended to any type of computing device capable of controlling the display of digital content(s) on a display.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for managing placement of a digital content based on metric thresholds, the method comprising:
storing in a memory of a server parameters associated to a plurality of locations, the parameters for each location comprising at least one metric and a corresponding threshold for each metric, the parameters associated to a given location of the plurality of locations comprising a given metric related to a display loop and a corresponding given threshold;
determining by a processing unit of the server a plurality of candidate locations from the plurality of locations for displaying the digital content, the plurality of candidate locations comprising the given location;
for each candidate location, processing by the processing unit of the server the at least one metric and the at least one corresponding threshold of the candidate location to determine if each metric of the at least one metric is within the corresponding threshold, the processing comprising determining if the given metric associated to the given location and related to the display loop is within the corresponding given threshold; and identifying by the processing unit of the server one or more target location from the plurality of candidate locations for displaying the digital content, each metric of the at least one metric of the one or more target location being within the corresponding threshold.

2. The method of claim 1, wherein the given metric associated to the given location and related to the display loop consists of: a number of digital contents in the display loop, a duration of the display loop, a duration of a given digital content in the display loop, a number of digital contents of a given type in the display loop, a budget for each digital content in the display loop, a time ratio for digital contents of a given type in the display loop, or a time ratio per targeted demographics in the display loop.

3. The method of claim 1, wherein the threshold corresponding to one or more metric of the at least one metric has a value which varies based on a time-slot.

4. The method of claim 1, wherein determining if one metric of the at least one metric is within the corresponding threshold comprises one of the following:
determining if the one metric is lower than a maximum value, determining if the one metric is lower or equal than a maximum value, determining if the one metric is higher than a minimum value, determining if the one metric is higher or equal than a minimum value, determining if the one metric is within an inclusive interval of values, and determining if the one metric is outside an exclusive interval of values.

5. The method of claim 1, wherein the parameters associated to several of the plurality of locations comprise a plurality of metrics and a corresponding plurality of thresholds.

6. The method of claim 1, wherein each location identifies one of the following: a computing device capable of displaying the digital content on at least one display controlled by the computing device, a geographical area comprising several computing devices capable of displaying the digital content on displays controlled by the computing devices, and a display capable of displaying the digital content under the control of a computing device.

7. The method of claim 1, further comprising transmitting to at least one computing device associated to each target location via a communication interface of the server at least one of: the digital content and a unique identifier of the digital content.

8. The method of claim 7, wherein the server is a digital signage server, the digital content is a digital signage content, and the at least one computing device is a digital signage player.

9. The method of claim 1, wherein the determination of the plurality of candidate locations from the plurality of locations for displaying the digital content is based on characteristics of the digital content.

10. The method of claim 9, wherein the characteristics of the digital content comprises at least one of the following: a target geographical area, target demographics, a target number of viewers, a target time of play, a target number of displays, and a target budget.

11. The method of claim 1, further comprising identifying one candidate location for which each metric of the at least one metric is within the corresponding threshold if one or more other digital content previously allocated to the candidate location is removed from the candidate location.

12. A non-transitory computer program product storing instructions executable by a processing unit of a server, the execution of the instructions by the processing unit of the server providing for managing placement of a digital content based on metric thresholds by:
storing in a memory of the server parameters associated to a plurality of locations, the parameters for each location comprising at least one metric and a corresponding threshold for each metric, the parameters associated to a given location of the plurality of locations comprising a given metric related to a display loop and a corresponding given threshold;

determining a plurality of candidate locations from the plurality of locations for displaying the digital content, the plurality of candidate locations comprising the given location;

for each candidate location, processing the at least one metric and the at least one corresponding threshold of the candidate location to determine if each metric of the at least one metric is within the corresponding threshold, the processing comprising determining if the given metric associated to the given location and related to the display loop is within the corresponding given threshold; and identifying one or more target location from the plurality of candidate locations for displaying the digital content, each metric of the at least one metric of the one or more target location being within the corresponding threshold.

13. A server comprising:
memory for storing parameters associated to a plurality of locations, the parameters for each location comprising at least one metric and a corresponding threshold for each metric, the parameters associated to a given location of the plurality of locations comprising a given metric related to a display loop and a corresponding given threshold; and a processing unit comprising one or more processor for:
determining a plurality of candidate locations from the plurality of locations for displaying the digital content, the plurality of candidate locations comprising the given location;

for each candidate location, processing the at least one metric and the at least one corresponding threshold of the candidate location to determine if each metric of the at least one metric is within the corresponding threshold, the processing comprising determining if the given metric associated to the given location and related to the display loop is within the corresponding given threshold; and identifying one or more target location from the plurality of candidate locations for displaying the digital content, each metric of the at least one metric of the one or more target location being within the corresponding threshold.

14. The server of claim 13, wherein the given metric associated to the given location and related to the display loop consists of: a number of digital contents in the display loop, a duration of the display loop, a duration of a given digital content in the display loop, a number of digital contents of a given type in the display loop, a budget for each digital content in the display loop, a time ratio for digital contents of a given type in the display loop, or a time ratio per targeted demographics in the display loop.

15. The server of claim 13, wherein the threshold corresponding to one or more metric of the at least one metric has a value which varies based on a time-slot.

16. The server of claim 13, wherein determining if one metric of the at least one metric is within the corresponding threshold comprises one of the following: determining if the one metric is lower than a maximum value, determining if the one metric is lower or equal than a maximum value, determining if the one metric is higher than a minimum value, determining if the one metric is higher or equal than a minimum value, determining if the one metric is within an inclusive interval of values, and determining if the one metric is outside an exclusive interval of values.

17. The server of claim 13, wherein the parameters associated to several of the plurality of locations comprise a plurality of metrics and a corresponding plurality of thresholds.

18. The server of claim 13, wherein each location identifies one of the following: a computing device capable of displaying the digital content on at least one display controlled by the computing device, a geographical area comprising several computing devices capable of displaying the digital content on displays controlled by the computing devices, and a display capable of displaying the digital content under the control of a computing device.

19. The server of claim 13, wherein the processing unit further transmits to at least one computing device associated to each target location via a communication interface of the server at least one of: the digital content and a unique identifier of the digital content.

20. The server of claim 19, wherein the server is a digital signage server, the digital content is a digital signage content, and the at least one computing device is a digital signage player.

21. The server of claim 13, wherein the determination of the plurality of candidate locations from the plurality of locations for displaying the digital content is based on characteristics of the digital content.

22. The server of claim 21, wherein the characteristics of the digital content comprises at least one of the following: a target geographical area, target demographics, a target number of viewers, a target time of play, a target number of displays, and a target budget.

23. The server of claim 13, wherein the processing unit further identifies one candidate location for which each metric of the at least one metric is within the corresponding threshold if one or more other digital content previously allocated to the candidate location is removed from the candidate location.

* * * * *